Patented Oct. 31, 1944

2,361,740

UNITED STATES PATENT OFFICE 2,361,740

THERMOFLUID PRINTING INK

Jesse Kenneth Boggs, Niagara Falls, N. Y., and Lothian M. Burgess, Chatham, N. J., assignors to J. M. Huber, Inc., New York, N. Y., a corporation of New Jersey No Drawing. Application April 24, 1941, Serial No. 390,114

8 Claims. (Cl. 106—29)

This invention relates to new and useful improvements in normally solid or thermo-fluid printing inks for use in printing according to the recently developed "cold set" printing process, as set forth, for example, in a co-pending application of Walter Huber, filed August 3, 1939, now United States Patent No. 2,268,594. In that process solid ink is heated and melted and then printed in thin molten films onto relatively cold stock so that it freezes immediately to form dry prints adhering to the surface of the stock.

Thermo-fluid ink compositions which in other respects possess satisfactory qualities have sometimes caused trouble in use because they tended to form rough prints when printed at the required printing press speeds at temperatures readily available from the printing press heating system. Whenever rough prints are produced there is a loss of appearance and a danger of ink scraping off and marring the paper as it passes over angle bars or folders or is otherwise subject to abrasion in the course of the printing operations. To meet this problem it has heretofore been necessary either to increase the printing temperature or to provide ink of modified composition by including in the ink vehicle less effective proportions or types of hardening or toughening ingredients, or more effective proportions or types of liquefying or plasticizing ingredients, so that the ink would possess a greater fluidity at the actual printing temperature and when printed would conform properly to the surface of the paper stock before freezing to a solid condition.

An object of this invention is to provide new thermo-fluid printing inks having improved viscosity and printing qualities at elevated printing temperatures, and, more particularly, to provide such inks which are superior to known thermofluid inks of comparable basic composition in that they possess similar characteristics of hardness, toughness and freedom from objectionable tack at ordinary temperatures but are much more fluid and have better printing qualities at elevated printing temperatures.

Another object is to provide improved thermofluid printing inks for high speed commercial printing operations according to the "cold set" process.

In accordance with the present invention, we have found that the trouble hereinbefore mentioned may be alleviated and that the printing qualities of various thermo-fluid inks which tend to print roughly may be substantially improved by incorporating in the ink vehicles small proportions of certain organic polar-non-polar substances of high molecular weight, of which zinc resinate, zinc naphthenate, lead naphthenate, lecithin and Aerosol OT (an ester of aliphatic sulfodicarboxylic acid, produced by American Cyanamid Co.) are illustrative examples. All of these substances contain strongly polar groups, such as metallic atoms or sulfonic radicals, and non-polar groups of high molecular weight, such as resinic, naphthenic, fatty acid or fatty alcohol radicals. Their use in small proportions in thermo-fluid ink vehicles of the type hereinafter described results in a pronounced improvement in the printing qualities of the ink when it is melted and printed at elevated temperatures.

Our complete inks, in addition to a small proportion of an organic polar-non-polar compound as aforesaid, consist generally of coloring material, mainly pigments, incorporated in normally solid thermo-fluid vehicles which melt and impart the required fluidity, body, length, cohesiveness and other printing qualities to the ink at elevated printing temperatures and which freeze quickly when printed in thin ink films onto relatively cold stock so as to form substantially dry prints having the desired adherence, hardness, smudge-resistance and freedom from tack or stickiness. The vehicles of these inks contain principally hard thermo-plastic resin and hard wax-like material, with or without minor proportions of additional organic liquefying or plasticizing material such as certain vegetables or mineral oils, soft resins, pitches, etc.

The hard resin content preferably includes hard cumarone resin, hard rosin or rosin derivative, such as the resins known commercially as "Cumar" and "Neville" resins, wood rosin, limed rosin, ester gum, ester gum of hydrogenated rosin, polyphenolic and lignin acid residues from wood rosin extraction (such as the product known commercially as "Vinsol" resin), rosin maleate ester gums and polymerized iso-butylene or hydrocarbon resins. A substantial proportion of gilsonite or, of other resin that is "long" or stringy when molten, is included in the resin content of some vehicles to add "length" to the molten ink.

The wax-like material may be a natural wax such as carnauba, montan, candelilla or highmelting paraffin wax, or these natural waxes may be used in conjunction with or substituted by synthetic waxes or wax substitutes, of which hydrogenated soya bean oil and monoethanolamide of hydrogenated castor oil fatty acids ("DBI wax," produced by National Oil Products Co.) are preferred examples. Wax-like materials of this type, which possess a pronounced freedom from tack and a water-like fluidity when molten, may displace oil or other soft or liquid liquefying material when used in comparatively large proportions.

In preferred embodiments of the present invention the thermo-fluid vehicle is made with about ¼% to 5%, by weight, of the higher molecular organic polar-non-polar compound, and the coloring pigment is ground with the vehicle in the presence of this compound to produce the final ink. The grinding operations are carried out in heated grinding mills at temperatures sufficient to keep the fusible constituents of the vehicle in a molten condition. In making the vehicle, the highest melting resin constituent is usually melted first in a suitably heated container, after which any lower melting resin, the wax-like material, the polar-non-polar compound and any additional liquefying material are stirred in, in any desired order, to form a homogeneous molten mixture. When this mixture has been ground thoroughly with the pigment, the resulting molten ink is poured into containers and allowed to cool and become solid.

The following are illustrative examples of the improved inks:

Example 1

| | Parts by weight |
|---|---|
| Hydrogenated rosin ester gum | 57 |
| Carnauba wax | 10 |
| Blown soya bean oil | 10 |
| Lead naphthenate | 1 |
| Carbon black | 18 |
| Toners | 4 |

Example 2

| | |
|---|---|
| Ester gum #125 of American Cyanamid Co. | 62.5 |
| Carnauba wax | 18.0 |
| Aerosol OT | 1.0 |
| Carbon black | 16.0 |
| Toners | 3.5 |

Example 3

| | |
|---|---|
| Cumar W | 10 |
| Gilsonite | 40 |
| Hydrogenated soya bean oil | 40 |
| DBI wax | 5 |
| Zinc naphthenate | 2.5 |
| Carbon black | 20 |
| Flushed toner | 6 |

Example 4

| | |
|---|---|
| Cumar V | 28.0 |
| Gilsonite | 21.0 |
| Hydrogenated soya bean oil | 40.5 |
| Carnauba wax | 10.5 |
| Zinc resinate | 4.0 |
| Milori blue | 22.5 |
| Red toner | 3.7 |

As an indication of the greatly increased fluidity of the improved inks when molten, it may be mentioned that the ink of Example 4 showed a viscosity of 13 poises when tested with a Brookfield "Synchro-Lectric" viscosimeter at 220° F.; whereas another ink lacking the zinc resinate but otherwise of the same composition showed a viscosity of 48 poises when tested at 220° F. with the same instrument. Both inks possessed hardness and toughness characteristics desirable for thermo-fluid printing inks, but the ink of the example has printing qualities far superior to the other, particularly for high speed "cold set" printing operations.

The normally solid printing inks herein disclosed are generally substantially free of volatile solvents, oxidizing or drying ingredients, thermosetting materials or the like, so that they are substantially stable against chemical change during use, and they retain their desirable physical characteristics and printing qualities after repeated heating and cooling operations. It will be understood, however, that small proportions of such ingredients may be included in the inks for special purposes without departing from our invention.

It will also be understood that the specific constituents and formulae set forth herein are mentioned only as presently preferred examples. Our invention may be embodied in various other formulae, using the above-mentioned or various other constituents, without restriction to the details herein disclosed except as may be required by a fair interpretation of the appended claims.

We claim:

1. A printing ink which is solid at normal temperatures and melts to a fluid printing consistency at elevated temperatures comprising a homogeneous mixture of coloring pigment with a normally solid thermo-fluid vehicle consisting predominantly of hard, thermo-plastic resin and hard waxy material and containing from about ¼% to not more than about 5% of a higher molecular organic polar-non-polar compound.

2. A printing ink which is solid at normal temperatures and melts to a fluid printing consistency at elevated temperatures, comprising a homogeneous mixture of coloring pigment with a normally solid thermo-fluid vehicle containing about ¼% to 5% of a polar-non-polar ester of higher molecular sulfonated dicarboxylic acid.

3. A printing ink which is solid at normal temperatures and melts to a fluid printing consistency at elevated temperatures, comprising a homogeneous mixture of coloring pigment with a normally solid thermo-fluid vehicle containing about ¼% to 5% of sulfonated higher molecular aliphatic alcohol.

4. A thermo-fluid printing ink comprising coloring pigment incorporated in a normally solid thermo-fluid vehicle consisting predominantly of hard thermo-plastic resin and hard wax-like material and containing about ¼% to 5% of a higher molecular organic polar-non-polar compound.

5. A thermo-fluid printing ink comprising coloring pigment incorporated in a normally solid thermo-fluid vehicle consisting of hard thermo-plastic resin as the principal ingredient, hard wax-like material, organic plasticizing material, and from about ¼% to not more than 5% of a higher molecular organic polar-non-polar compound.

6. A printing ink for the commercial printing of publications, containers and other printed matter, which is solid at normal temperatures and possesses a fluid printing consistency at elevated temperatures substantially above its melting point, said ink comprising coloring pigment incorporated in a thermo-fluid solid vehicle containing predominantly hard thermo-plastic resin, hard wax, normally solid hydrogenated oil and from about ¼% to about 5% of a polar-non-polar substance from the group consisting of heavy metal salts of higher molecular organic acids and sulfonated higher molecular acids and alcohols.

7. The method of improving the printing quality of normally solid printing ink to be printed in a heated, molten condition, which comprises grinding the ink pigment with the thermo-fluid ink vehicle while the vehicle is in a heated molten condition and in the presence of a small amount of a higher molecular organic polar-non-polar compound equivalent to about ¼% to 5% of the weight of the vehicle.

8. The method of improving the printing quality of normally solid printing ink to be printed in a heated, molten condition which comprises grinding the ink pigment with the molten thermo-fluid ink vehicle in the presence of about ¼% to 5% of a higher molecular polar-non-polar organic wetting agent, and then allowing the ink to cool and become solid.

JESSE KENNETH BOGGS.
     LOTHIAN M. BURGESS.